United States Patent
Lin (10) Patent No.: US 6,457,628 B1
(45) Date of Patent: Oct. 1, 2002

(54) SAFETY SWITCH DEVICE FOR GAS JET SOLDERING GUN

(76) Inventor: Arlo H. T. Lin, No. 5, Lane 25, Da Tong Rd., Wu Feng Hsiang, Taichung Hsien (TW)

( * ) Notice: Subject to any disclaimer, the term of this patent is extended or adjusted under 35 U.S.C. 154(b) by 0 days.

(21) Appl. No.: 09/756,634

(22) Filed: Jan. 8, 2001

(51) Int. Cl.[7] ................................................. B23K 5/22
(52) U.S. Cl. ...................... 228/20.1; 228/20.5; 126/237
(58) Field of Search .................... 228/19, 20.1, 20.5; 219/227, 228, 229; 392/379; 126/413, 236, 237, 238

(56) References Cited

U.S. PATENT DOCUMENTS

| 4,641,632 A | * | 2/1987 | Nakajima |
| 4,688,551 A | * | 8/1987 | Nakajima |
| 4,716,885 A | * | 1/1988 | Zaborowski |
| 4,726,767 A | * | 2/1988 | Nakajima |
| 4,785,793 A | * | 11/1988 | Oglesby et al. |
| 4,920,952 A | * | 5/1990 | Nakajima |
| 4,932,393 A | * | 6/1990 | Sim |
| 4,966,128 A | * | 10/1990 | Wang |
| 5,054,106 A | * | 10/1991 | Fortune |
| 5,154,322 A | * | 10/1992 | Sim |
| 5,380,982 A | * | 1/1995 | Fortune |
| 5,771,881 A | * | 6/1998 | Oglesby et al. |
| 5,803,061 A | * | 9/1998 | Kao |
| 5,901,881 A | * | 5/1999 | Wang |
| 5,921,231 A | * | 7/1999 | Butler |

* cited by examiner

Primary Examiner—Tom Dunn
Assistant Examiner—Kiley Stoner
(74) Attorney, Agent, or Firm—Charles E. Baxley (57) ABSTRACT

A safety switch device for a gas jet soldering gun includes a ignition push button having an outer periphery provided with a locking drive block, a housing having an inner wall defining an L-shaped drive slot mating with the locking drive block, and a spring mounted in the ignition push button for providing an axial thrust and a rotational torque. In such a manner, the user has to rotate the ignition push button to a proper position so that the ignition push button can be pressed to drive the igniter to ignite the fire, thereby preventing a child from freely opening the gas jet soldering gun.

3 Claims, 8 Drawing Sheets

SAFETY SWITCH DEVICE FOR GAS JET SOLDERING GUN

BACKGROUND OF THE INVENTION

1. Field of the Invention

The present invention relates to a safety switch device, and more particularly to a safety switch device for a gas jet soldering gun.

2. Description of the Related Prior Art

Figure 1:
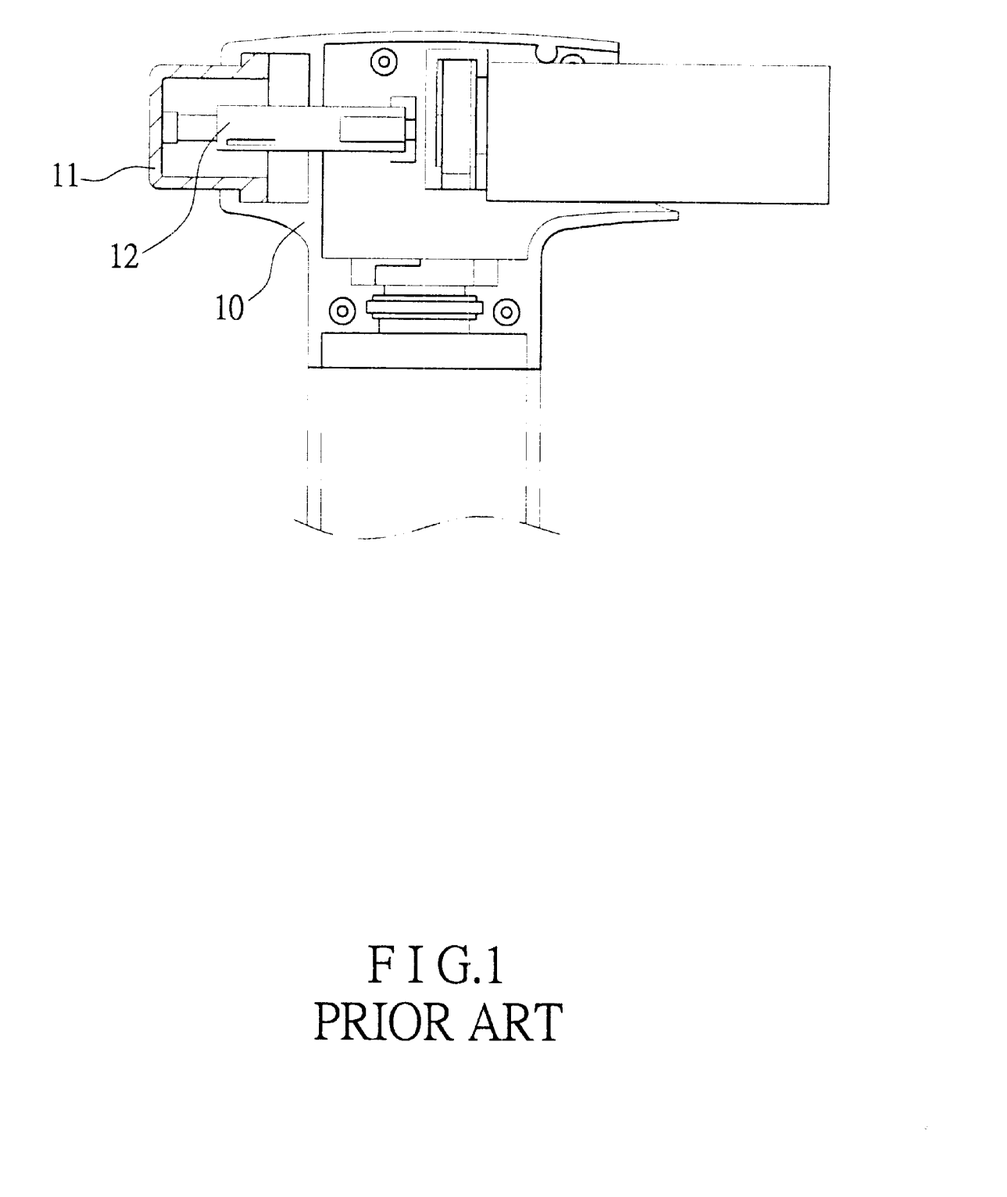
FIG. 1 is a side plan view of a conventional gas jet soldering gun in accordance with the prior art.
Figure 2:
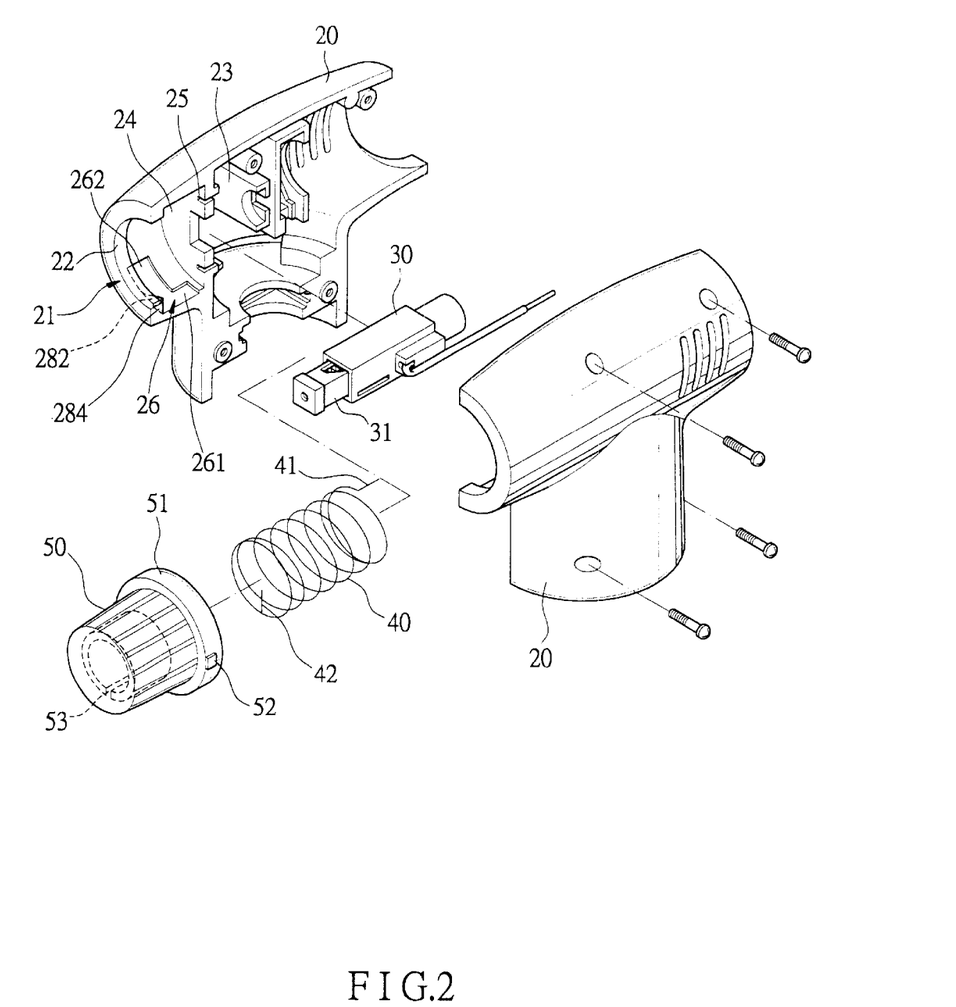
FIG. 2 is an exploded perspective view of a safety switch device for a gas jet soldering gun in accordance with the present invention.
Figure 3:
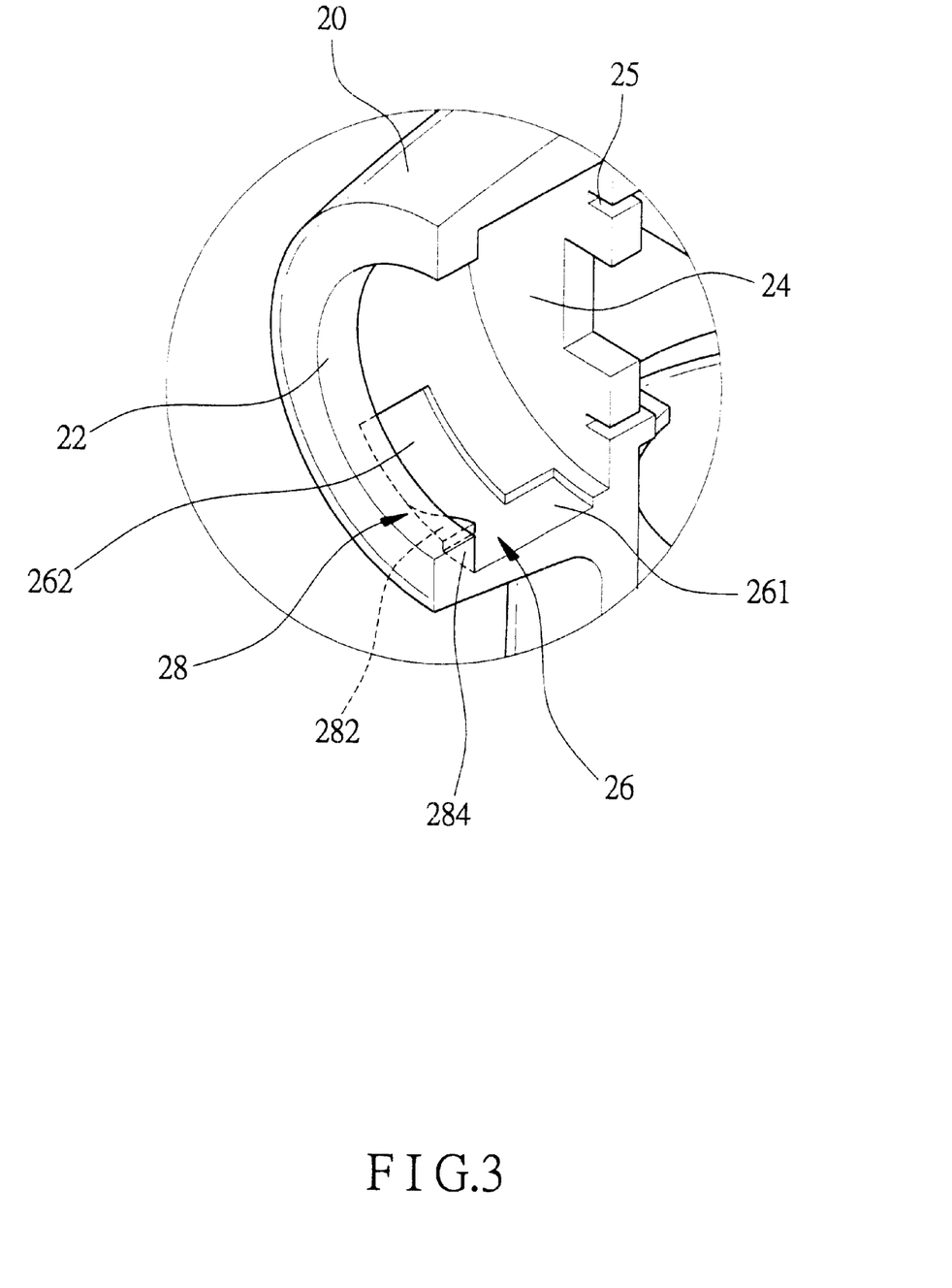
FIG. 3 is a partially cut-away enlarged view of the safety switch device for a gas jet soldering gun as shown in FIG. 2.
Figure 4:
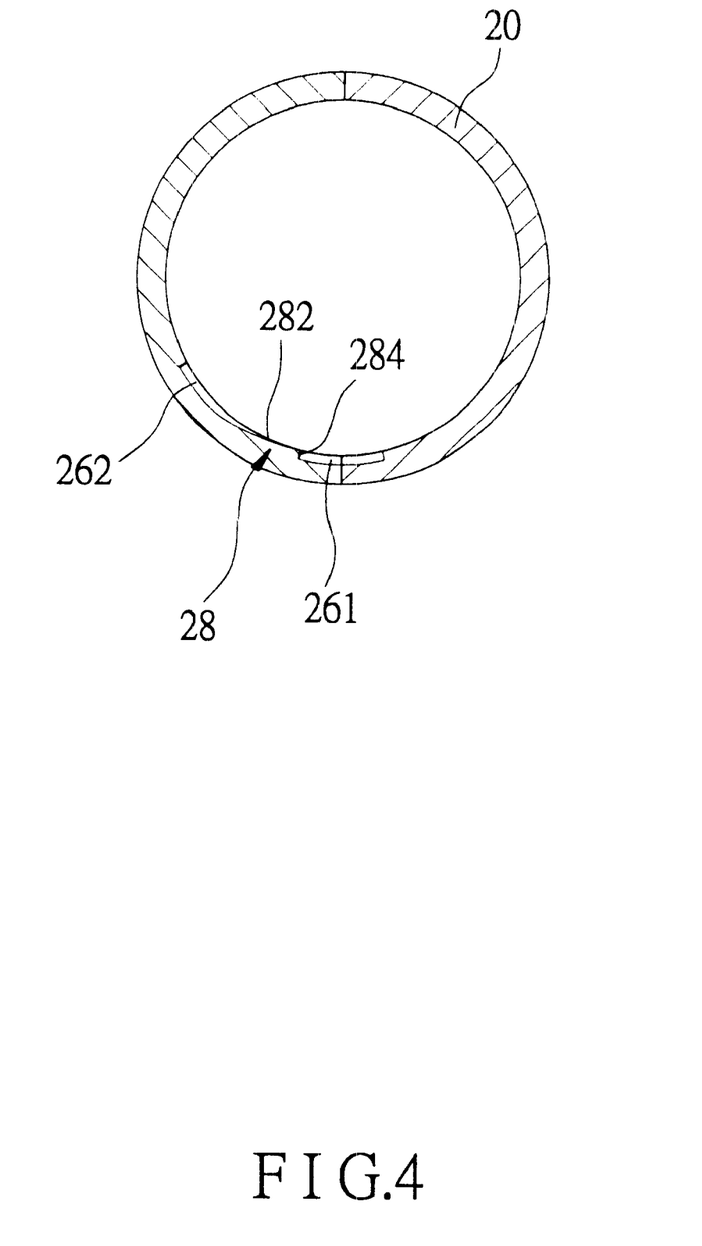
FIG. 4 is a front plan cross-sectional assembly view of the safety switch device for a gas jet soldering gun as shown in FIG. 2.

A conventional gas jet soldering gun in accordance with the prior art shown in FIG. 1 comprises a housing 10, an igniter 12 mounted in the housing 10, and a push button 11 mounted on the housing 10 for pressing the push button 11 so as to start the igniter 12 to ignite the fire. However, a child or a person may unintentionally and easily touch -and press the push button 11 to start the igniter 12 to ignite so that the front end of the gas jet soldering gun will eject a flame at a high temperature, thereby easily injuring the child or the person.

SUMMARY OF THE INVENTION

In accordance with the present invention, there is provided a safety switch device for a gas jet soldering gun comprising:

a housing, having a rear end defining an opening, the opening having an inner side provided with a catch flange, the catch flange having an inner side wall face defining an L-shaped drive slot including a longitudinal slot and a transverse slot communicating with each other, the housing having a positioning seat mounted in a predetermined position thereof, a catch block mounted in the housing and located between the opening and the positioning seat, a hook seat provided in the catch block;

an igniter, positioned on the positioning seat of the housing, and including a drive lever protruding outward from the opening of the housing, the drive lever being pressed to form an electronic ignition action;

a spring, fitted outside of the igniter, and having a first end provided with a first locking hook and a second end provided with a second locking hook, the first locking hook located toward one side of the igniter and positioned in the hook seat of the catch block of the housing; and a cap-shaped ignition push button, having an inner edge rested on the drive lever of the igniter and the spring, and having a lower edge provided with a protruding annular flange mating with the catch flange of the opening of the housing, the protruding annular flange slidably mounted in the housing, and having an outer periphery provided with a locking drive block, the locking drive block being slidable to be inserted into the L-shaped drive slot of the housing, an insertion hook provided in the ignition push button for securing the second locking hook of the spring, whereby the spring stores a compression stress and a torsion stress, so that the ignition push button can in turn be returned to and locked in the transverse slot of the L-shaped drive slot of the housing.

The primary objective of the present invention is to provide a safety switch device for a gas jet soldering gun which includes a ignition push button having an outer periphery provided with a locking drive block, a housing having an inner wall defining an L-shaped drive slot mating with the locking drive block, and a spring mounted in the ignition push button for providing an axial thrust and a rotational torque. In such a manner, the user has to rotate the ignition push button to a proper position so that the ignition push button can be pressed to drive the igniter to ignite the fire, thereby preventing a child from freely opening the gas jet soldering gun.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 2–5, a safety switch device for a gas jet soldering gun in accordance with the present invention comprises a housing 20, an igniter 30, a spring 40, and a cap-shaped ignition push button 50.

The housing 20 has a rear end defining an opening 21. The opening 21 has an inner side provided with a catch flange 22. The catch flange 22 has an inner side wall face defining an L-shaped drive slot 26 which includes a longitudinal slot 261 and a transverse slot 262 communicating with each other. The housing 20 has a positioning seat 23 mounted in a predetermined position thereof. A catch block 24 is mounted in the housing 20 and located between the opening 21 and the positioning seat 23. A hook seat 25 is provided in the catch block 24.

The igniter 30 is positioned on the positioning seat 23 of the housing 20, and includes a drive lever 31 protruding outward from the opening 21 of the housing 20. The drive lever 31 of the igniter 30 may be pressed to form an electronic ignition action.

The spring 40 is fitted outside of the igniter 30, and has a first end provided with a first locking hook 41 and a second end provided with a second locking hook 42. The first locking hook 41 of the spring 40 is located toward one side of the igniter 30 and is positioned in the hook seat 25 of the catch block 24 of the housing 20.

The cap-shaped ignition push button 50 has an inner edge rested on the drive lever 31 of the igniter 30 and the spring 40, and has a lower edge provided with a protruding annular flange 51 mating with the catch flange 22 of the opening 21 of the housing 20. The protruding annular flange 51 is slidably mounted in the housing 20, and has an outer periphery provided with a locking drive block 52. The locking drive block 52 is slidable in the L-shaped drive slot 26 of the housing 20. An insertion hook 53 is provided in the ignition push button 50 for securing the second locking hook 42 of the spring 40, whereby the spring 40 stores a compression stress and a torsion stress by the drawing effect of the first locking hook 41 and the second locking hook 42, so that the ignition push button 50 can be returned to and locked in the transverse slot 262 of the L-shaped drive slot 26 of the housing 20.

Figure 6:
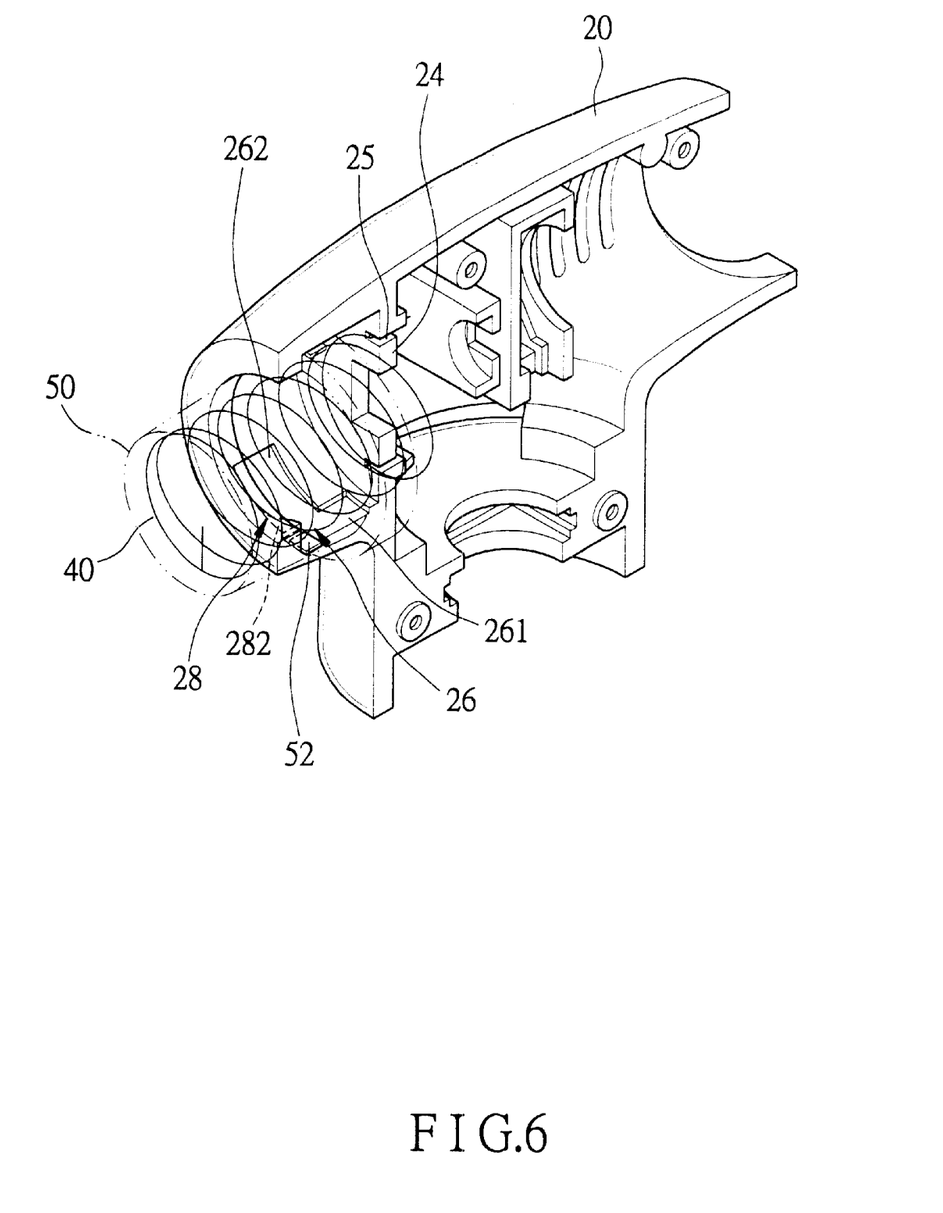
FIG. 6 is an operational view of the safety switch device for a gas jet soldering gun as shown in FIG. 5.

The safety switch device further comprises a positioning block 28 mounted in the L-shaped drive slot 26 of the housing 20 and located between the longitudinal slot 261 and the transverse slot 262. The positioning block 28 is located at the outer side of the transverse slot 26 toward one side of the ignition push button 50, whereby the locking drive block 52 is moved by rotation of the ignition push button 50 to slide in the transverse slot 26 toward the ignition push button 50 to pass through the positioning block 28 to be retained by a side wall 284 of the positioning block 28 so that the locking drive block 52 is positioned at a position located adjacent to a rear end of the longitudinal slot 261 as shown in FIG. 6. The positioning block 28 includes an inclined surface 282 for facilitating passage of the locking drive block 52 of the ignition push button 50.

Figure 5:
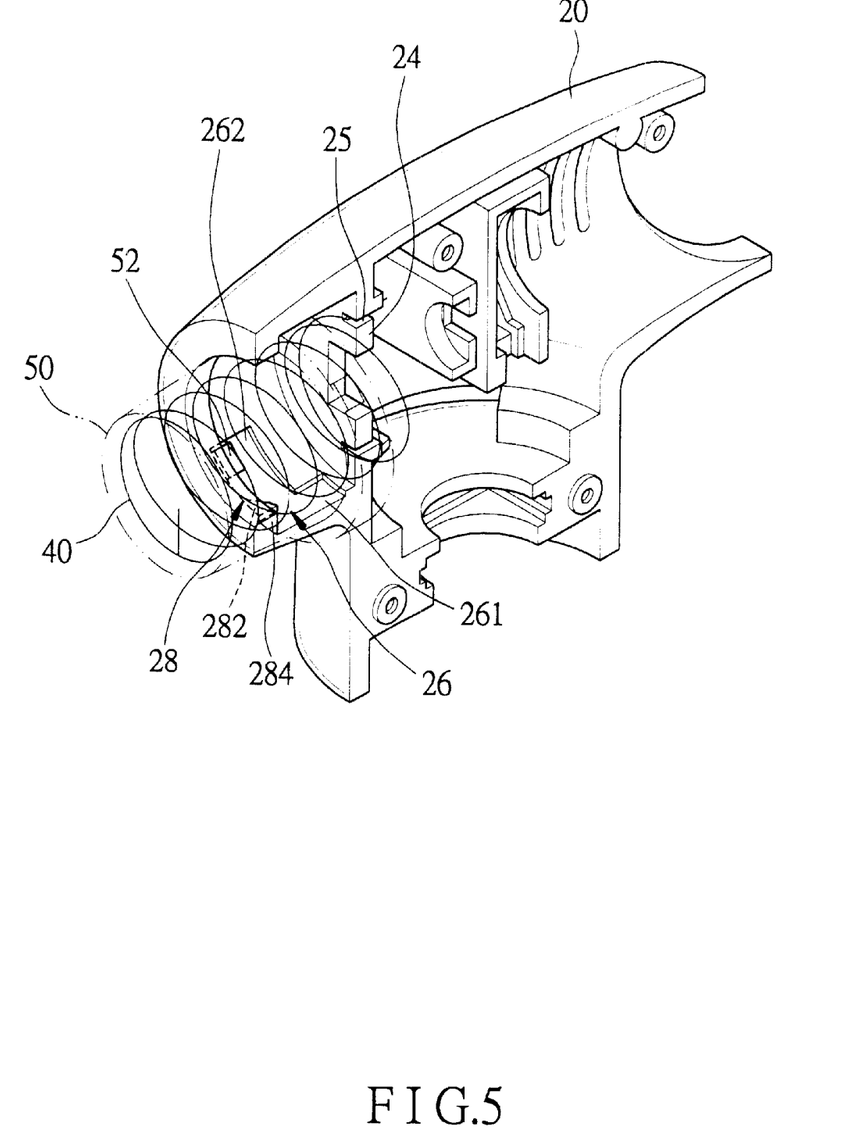
FIG. 5 is a partially assembly view of the safety switch device for a gas jet soldering gun as shown in FIG. 2.

In operation, referring to FIGS. 5–8 with reference to FIGS. 1–4, the locking drive block 52 of the ignition push button 50 is initially secured in and retained by the transverse slot 262 of the L-shaped drive slot 26 as shown in FIG. 5, so that the ignition push button 50 cannot be pressed to operate and start the igniter 30, thereby preventing a child or a person from unintentionally pressing the ignition push button 50 to start and open the gas jet soldering gun so as to assure the safety of gas jet soldering gun when not in use. The ignition push button 50 is then rotated to exert a torsion force on the spring 40 so as to move the locking drive block 52 which in turn slides in the transverse slot 262 and passes through the inclined surface 282 of the positioning block 28 to move from the position as shown in FIG. 5 to the position as shown in FIG. 6 where the locking drive block 52 is retained in place by the side wall 284 of the positioning block 28.

Figure 7:
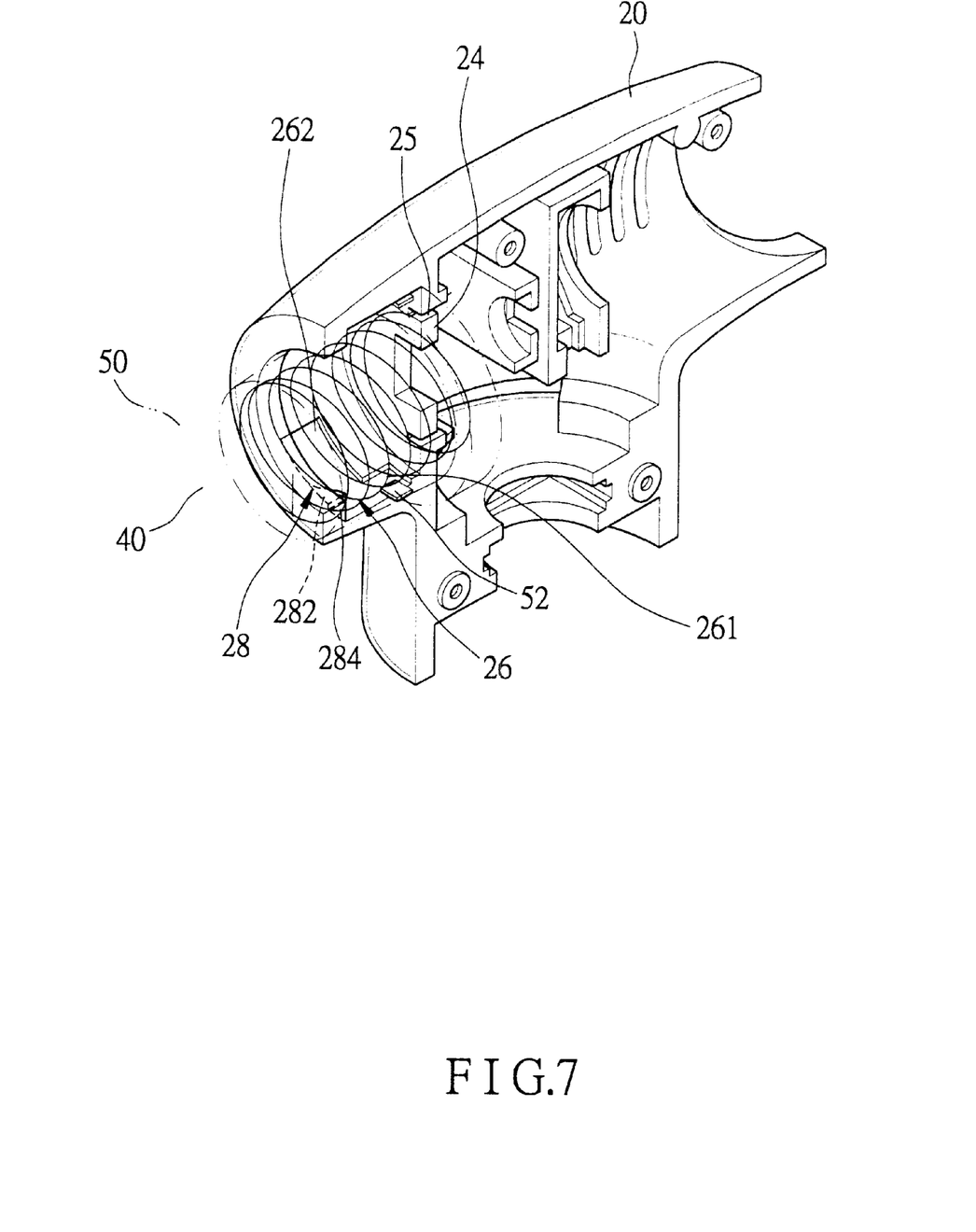
FIG. 7 is an operational view of the safety switch device for a gas jet soldering gun as shown in FIG. 6.
Figure 8:
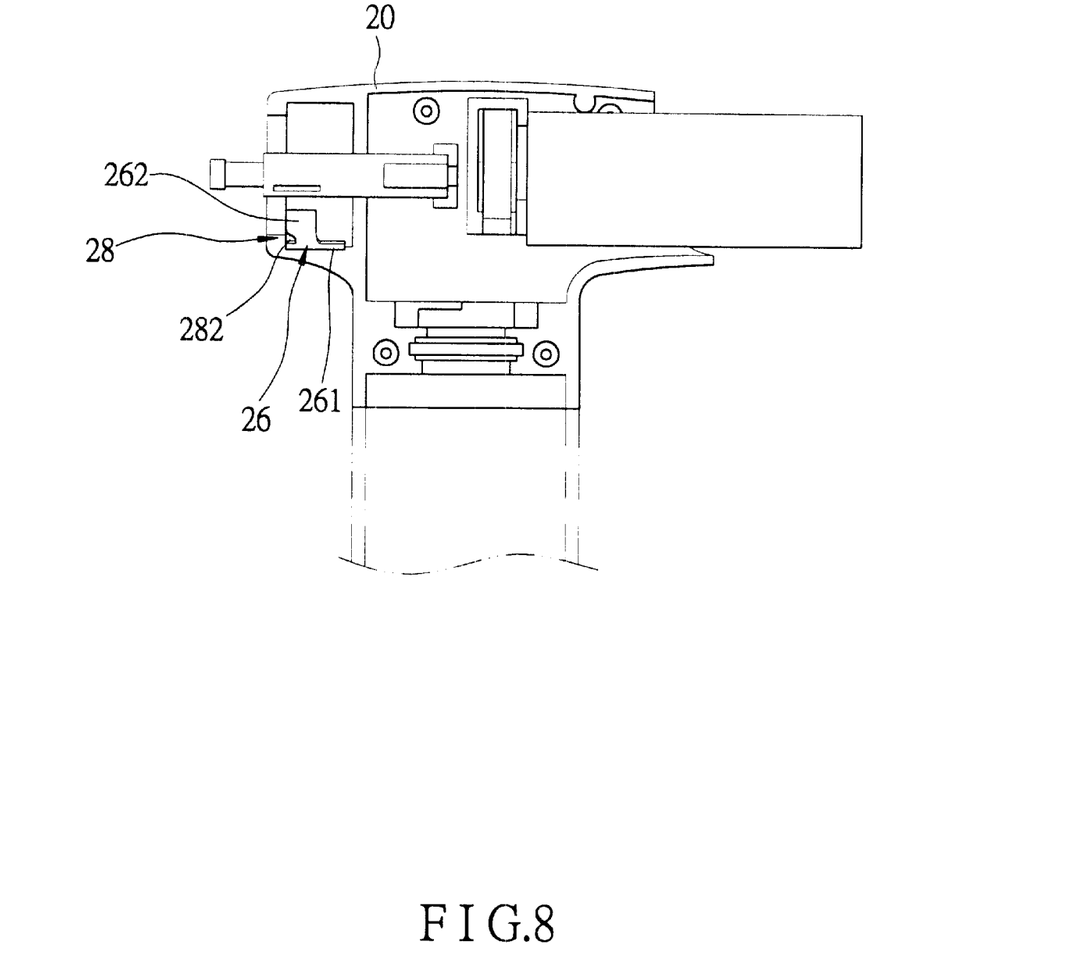
FIG. 8 is a side plan assembly view of the safety switch device for a gas jet soldering gun as shown in FIG. 2.

The ignition push button 50 is then pressed toward the igniter 30 to exert a compression force on the spring 40 so that the locking drive block 52 is moved from the position as shown in FIG. 6 to the position as shown in FIG. 7 to be received in the longitudinal slot 261, thereby pressing the drive lever 31 by the inner edge of the ignition push button 50 so as to start and ignite the igniter 30.

When the force exerted on the ignition push button 50 is removed, the locking drive block 52 of the ignition push button 50 is pushed outward toward the ignition push button 50 by means of the restoring compression stress of the spring 40, and is then returned into and locked in the transverse slot 262 of the L-shaped drive slot 26 of the housing 20 as shown in FIG. 5 by means of the restoring torsion stress of the spring 40.

Accordingly, the safety switch device in accordance with the present invention includes a ignition push button having an outer periphery provided with a locking drive block, a housing having an inner wall defining an L-shaped drive slot mating with the locking drive block, and a spring mounted in the ignition push button for providing an axial thrust and a rotational torque. In such a manner, the user has to rotate the ignition push button to a proper position before the ignition push button is pressed to start the igniter. When the ignition push button is rotated to the proper position, the ignition push button can be pressed to drive the igniter to ignite the fire, thereby preventing a child from freely opening the gas jet soldering gun.

It should be clear to those skilled in the art that further embodiments may be made without departing from the scope of the present invention.

What is claimed is:

1. A safety switch device for a gas jet soldering gun comprising:

a housing (20), having a rear end defining an opening (21), said opening (21) having an inner side provided with a catch flange (22), said catch flange (22) having an inner side wall face defining an L-shaped drive slot (26) including a longitudinal slot (261) and a transverse slot (262) communicating with each other, said housing (20) having a positioning seat (23) mounted in a predetermined position thereof, a catch block (24) mounted in said housing (20) and located between said opening (21) and said positioning seat (23), a hook seat (25) provided in said catch block (24);

an igniter (30), positioned on said positioning seat (23) of said housing (20), and including a drive lever (31) protruding outward from said opening (21) of said housing (20), said drive lever (31) being pressed to form an electronic ignition action;

a spring (40), fitted outside of said igniter (30), and having a first end provided with a first locking hook (41) and a second end provided with a second locking hook (42), said first locking hook (41) located toward one side of said igniter (30) and positioned in said hook seat (25) of said catch block (24) of said housing (20); and a cap-shaped ignition push button (50), having an inner edge rested on said drive lever (31) of said igniter (30) and said spring (40), and having a lower edge provided with a protruding annular flange (51) mating with said catch flange (22) of said opening (21) of said housing (20), said protruding annular flange (51) slidably mounted in said housing (20), and having an outer periphery provided with a locking drive block (52), said locking drive block (52) being slidable to be inserted into said L-shaped drive slot (26) of said housing (20), an insertion hook (53) provided in said ignition push button (50) for securing said second locking hook (42) of said spring (40), whereby said spring (40) stores a compression stress and a torsion stress, so that said ignition push button (50) can in turn be returned to and locked in said transverse slot (262) of said L-shaped drive slot (26) of said housing (20).

2. The safety switch device for a gas jet soldering gun in accordance with claim 1, further comprising a positioning block (28) mounted in said L-shaped drive slot (26) of said housing (20) between said longitudinal slot (261) and said transverse slot (262), said positioning block (28) located at an outer side of said transverse slot (26) toward one side of said ignition push button (50), whereby said locking drive block (52) is moved by rotation of said ignition push button (50) to slide in said transverse slot (26) toward said ignition push button (50) to pass through said positioning block (28) to be retained by a side wall (284) of said positioning block (28) so that said locking drive block (52) is positioned at a position located adjacent to a rear end of said longitudinal slot (261).

3. The safety switch device for a gas jet soldering gun in accordance with claim 2, wherein said positioning block (28) includes an inclined surface (282) for facilitating passage of said locking drive block (52) of said ignition push button (50).

* * * * *